Aug. 16, 1966 W. C. FLANAGAN, JR 3,266,113

INTERREACTING ARTICLES

Filed Dec. 14, 1964 9 Sheets-Sheet 1

INVENTOR.

WILLIAM C. FLANAGAN, JR.

BY

Carpenter, Abbott, Coulter & Kinney

ATTORNEYS

Aug. 16, 1966 W. C. FLANAGAN, JR 3,266,113

INTERREACTING ARTICLES

Filed Dec. 14, 1964 9 Sheets-Sheet 2

INVENTOR
WILLIAM C. FLANAGAN, JR.
BY
Carpenter, Abbott, Coulter & Kinney
ATTORNEYS INVENTOR.
WILLIAM C. FLANAGAN, JR.
BY
Carpenter, Abbott, Coulter & Kinney
ATTORNEYS Aug. 16, 1966 W. C. FLANAGAN, JR 3,266,113

INTERREACTING ARTICLES

Filed Dec. 14, 1964 9 Sheets-Sheet 4

INVENTOR.
WILLIAM C. FLANAGAN, JR.
BY
Carpenter, Abbott, Coulter & Kinney
ATTORNEYS INVENTOR.
WILLIAM C. FLANAGAN, JR.
BY
Carpenter, Abbott, Coulter & Kinney
ATTORNEYS Aug. 16, 1966

W. C. FLANAGAN, JR 3,266,113

INTERREACTING ARTICLES

Filed Dec. 14, 1964

9 Sheets-Sheet 6

INVENTOR.
WILLIAM C. FLANAGAN, JR.

BY

Carpenter, Abbott, Coulter & Kinney
ATTORNEYS

INVENTOR.
WILLIAM C. FLANAGAN, JR.
BY
Carpenter, Abbott, Coulter & Kinney
ATTORNEYS Aug. 16, 1966 W. C. FLANAGAN, JR 3,266,113
INTERREACTING ARTICLES
Filed Dec. 14, 1964 9 Sheets-Sheet 8

INVENTOR.
WILLIAM C. FLANAGAN, JR.
BY
Carpenter, Abbott, Coulter & Kinney
ATTORNEYS INVENTOR.
WILLIAM C. FLANAGAN, JR.
BY
Carpenter, Abbott, Coulter & Kinney
ATTORNEYS United States Patent Office 3,266,113
Patented August 16, 1966

3,266,113
INTERREACTING ARTICLES
William C. Flanagan, Jr., Hudson Township, St. Croix County, Wis., assignor to Minnesota Mining and Manufacturing Company, St. Paul, Minn., a corporation of Delaware
Filed Dec. 14, 1964, Ser. No. 423,889
22 Claims. (Cl. 24—204)

Figure 1:
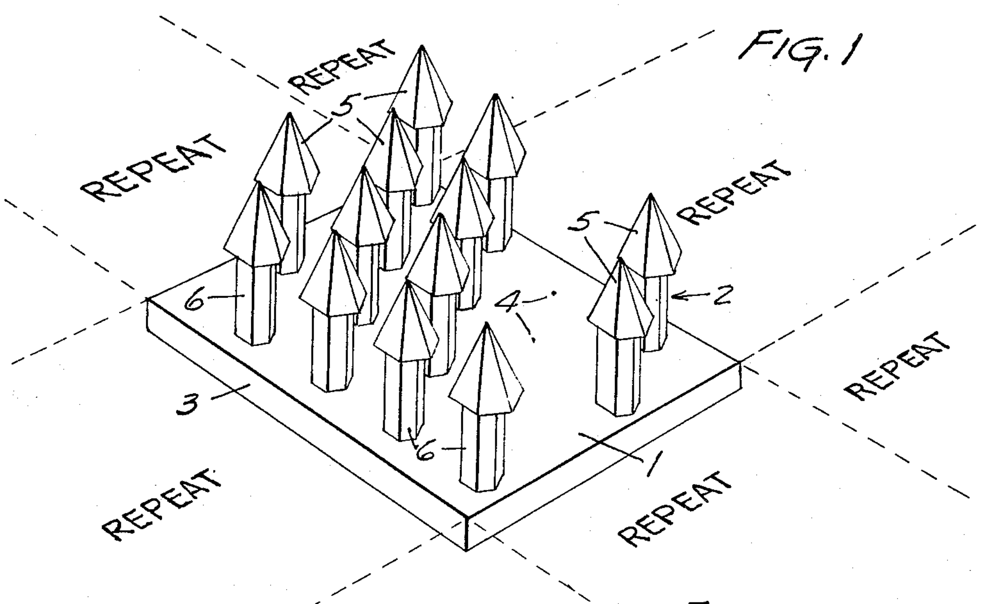

This application is a continuation-in-part of copending application S.N. 314,262, filed on October 7, 1963, now abandoned.

This invention relates to unitary articles having mechanically interreacting functional surfaces.

Various types of fasteners comprising complementary pairs of articles capable of engaging and holding to one another over an area or surface are known. In one type the holding power is derived from the entanglement of elements which vary from very light textile filaments to wires and which are shaped as hooks, loops, etc. (see Swiss Patent 295,638, French Patent 1,232,367, U.S. Patent 2,717,437 and U.S. Patent 3,076,244). The entanglement of elements therein lacks rigorous order and is usually completely random. The resistance to separation (i.e. substantially perpendicular to the surface) varies in these fasteners with the degree of entanglement which has been obtained and with the stiffness and density of the elements. A second type of fastener comprises complementary surfaces having matching projections and recesses with portions of the surfaces magnetized (see U.S. Patent 3,102,314). These surfaces, although ordered, have relatively little resistance to separation. A third type of fastener comprises a series (over a surface) of separate fasteners each having one spherically headed prong on one element gripped by four prongs on the other (see U.S. Patent 2,499,898). Finally, a fourth type of fastener comprising surface segments having a multiplicity of rectilinearly tapered bosses which are smaller in cross-section at the base than at the end (see U.S. Patent 3,101,517). These are interlocked and separated by squeezing the large ends past one another apparently by compression within the bosses. The third and fourth types of fasteners at best provide only moderate resistance to separation. These various fasteners are useful in some areas but all lack the combination of holding power, dependability and versatility necessary to a generally acceptable heavy duty fastener.

It has now been found possible to provide devices comprising complementary pairs of articles having surfaces which possess a much higher degree of dependable holding power through continuous surface wide reinforcement of headed elements. In addition, many of the articles of the invention are polyfunction, e.g. some engage easily but disengage dith difficulty, others engage from both sides of the functional surface, others engage to more than one level or depth, still others move while engaged in only one direction relative to one another, still others move while engaged about a fixed center in a rotary path relative to one another, etc. Single devices of this type can further be designed to perform combinations of such functions for particular end uses.

The devices of the invention comprise complementary pairs of interengaging unitary articles each having a functional surface comprising a two-dimensional array (field) of ordered and spaced spine-like, elastic locking elements which tend to resist positional displacement emanating from a relatively rigid base or backing member, in which:

(1) The elements comprise spine-like stems terminating in enlarged shaped heads which bear against the element heads of the other article during engagement and disengagement.

(2) A substantial force is required to move adjacent elements out of their normal relative positions and the normal relative positions are regained immediately upon removal of such force.

(3) The arrays of elements define regularly located spaces bounded by not less than three element loci which spaces are substantially just large enough to admit the heads of the elements of one article between the stems of the other upon application of forces sufficient to deform, spatially displace and interengage them.

(4) The elements of each article are disposed to undergo a predetermined pattern of operational engagement movements with the elements of the complementary article, said movements being accompanied by elastic deformation within the proportional limit and then recovery of the elements from elastic deformation, and (5) The elements of both articles are in continuous surface-wide bearing contact during movement, the contact pressure increasing with element displacement.

The position of each cam element is ordered both angularly and geometrically with respect to every other element and the base in the articles. Thus these elements are in effect small elastic cantilever beams.

Complementary articles often (but not always) have identical functional surface contours. The operational engagement movements involve relative motion of the complementary surfaces and include the initial engagement of the articles, the shifting of relative positions of the engaged surfaces in directions parallel to the surfaces, the shifting to different levels of engagement and disengagement. In a single movement each element moves past a single element of the complementary surface or moves to an adjacent level of engagement. The shape and arrangement of the cam or contour elements of complementary articles determines the particular operational engagement occurrences of which they are capable.

The surface-wide bearing contact of the elements of two articles during changes in engagement (i.e. movement) can be explained by assuming that the elements of two complementary articles are composed of an electrical conductor and the bases are composed of an electrical insulator. When the elements of these articles are in surface-wide bearing contact, an electrical potential applied to any element can be detected on any other element of either surface.

Each operational engagement movement is accompanied by the elastic deformation of the cam elements within the proportional limits of the elastic material and then recovery from deformation when the new position is reached. Ordinarily this recovery is complete, i.e. the normal positions of the cam elements are recovered upon reaching the new position of engagement. In some cases, however, certain of the elements only partially recover their normal positions (as will be seen). Preferably the elements on complementary functional surfaces are capable of undergoing simultaneous operational engagement although in some particular articles of the invention simultaneous engagement is difficult or impossible and sequential engagement is used.

The bases of the functional surfaces are important operational parts thereof. Forces are transmitted between adjacent or nearby elements of one article through the base and the stiffness and shape of the base are important in determining the operation and holding power of the article. When it is desired that the base should not deform overall, it can be either made quite thick or can be reinforced or stiffened. Ordinarily, however, the small portion of a base adjacent a single element may be deformed slightly, e.g. because of its unitary relationship with the element which is itself being deformed. Even where not necessary the bases are sometimes deformed, for convenience, e.g. to bring about sequential engagement in articles in which simultaneous engagement is possible but more difficult. Also that base of an engaged article can be made concave and disengagement or a change in engagement thereby made difficult or impossible.

Once two unitary articles having functional surfaces of the invention are in operational engagement, the individual cam elements of each are generally constrained between a plurality, normally at least three, of cam elements and the base of the complementary surface. Thus, a single element is restrained from movement out of engagement, from movement to other levels of engagement and from movement parallel to the planes of the engaged surfaces by the shapes of the cam elements of the other surface which surround it and by the portion of the base of the other surface which connects them. Any movement by the single element out of this constraint must be accompanied by sufficient force to bring about the elastic deformation of the cam elements necessary for the position shift. Preferably, for ease of fabrication, handling and storage, the stems of the elements are from about 0.025 to 1 inch in length and their length to diameter ratios are from about 2 to 10.

When two of the articles are operationally engaged they tend to remain so engaged, although they can usually be disengaged by forces pulling them apart (e.g. essentially normal to the planes of the surfaces) and/or by forces essentially parallel to the planes of the engaged surfaces moving them past one another and thus ultimately out of engagement. Depending upon the design and the particular elastic material which is used, the articles of the invention can be usable once, several times or many times. In certain articles of the invention disengagement can be accomplished only by forces sufficient to destroy the functional surfaces by tension or shear, these articles being intended to hold permanently.

Ordinarily two complementary (i.e. mutually interreacting) functional surfaces of the invention will have the same surface configurations and they will be so considered herein unless otherwise specifically noted. It is, however, sometimes desirable to utilize dissimilar surfaces together and this is also considered to be within the scope of the invention. In addition, it is noted that the functional surfaces can be carried on the flat or curved surfaces of variously shaped articles, e.g. on sheets, spheres, cylinders, cubes, etc. and that a single unitary article can have a plurality of functional surfaces thereon.

The operational functions of one article with respect to its complementary article are performed over a surface area. The actual shear, tensional and torsional holding capacity between two interlocked functional surfaces depends upon the elastic deformation of many stem element sections under physical loading. This permits the distribution of the gross tensile, compressive and shear stress loads among the many elements which are interlocked. The holding power of a unit area (e.g. a square inch) of a pair of interpenetrated articles in stress with respect to one another (tension, shear or torsion or a combination thereof) can be generally determined by multiplying the number of contour elements per unit area on one article by the minimal cross sectional area of the elastic material in the stem of one element by the elastic limit of stress of the material used in the article by a factor of safey (ordinarily 0.5 is used). Reference is made to the book "Formulas for Stress and Strain" by R. J. Roark, McGraw-Hill Book Company, Inc., 1943, for definitions of various terms relating to strength of materials, e.g. elastic, elastic limit, deformation and elastic deformation, page 5; proportional limit, page 11; and stress, page 12.

The overall pattern of the cam or contour elements on the functional surfaces of the invention is referred to herein as the array. This array is two-dimensional in that the ordered loci of the elements are on a field or surface, although the surface itself may be curved. The angular orientation of each element (both as to its axis relative to the base and as to its rotation with respect to the other elements) is also ordered and is considered to be part of the overall order of the array. The elements in most of the functional surfaces of the invention are located in regular grid patterns with regular patterns of skipped positions, i.e. elements missing from certain positions in the grid. The smallest repeating pattern of elements on the grid, taking into consideration the skipped positions is called the unit pattern. The grids vary in basic geometry (e.g. including rectangular, hexagonal, etc.) and in relative spacing of the elements in different directions.

The arrays are not invariably made up of repeating identical unit patterns. Thus, in certain articles of the invention the elements are arranged in a circular array. In others the grid spacings vary gradually from one end of the functional surface to the other to increase or decrease the force required to translate the engaged surfaces relative to one another. Further, in certain cases, it is desirable to include cam or contour elements on the same functional surface which vary in size, shape and/or angular orientation.

As noted previously, the individual cam elements of the invention each interact with a plurality of elements from another (second) surface which are positioned in a plurality of ranks or lines. Each of them is in turn acted upon by a plurality of elements of the first surface from different ranks or lines. Thus ranks or lines of elements on the edges of a functional surface of the invention do not operate as typical elements of the surface, and in fact edge effects due to decreased lateral support of elements in engaged functional surfaces often extend inward two or more rows or ranks of elements. Because of this, the articles of the invention ordinarily do not carry fewer than five rows or ranks of elements on a surface (including the edge rows or ranks) and preferably not less than about seven rows or ranks.

The engagement and operation of pairs of articles according to the invention are described basically by three characteristics of the functional surfaces thereof. Since the articles are ordinarily used in pairs these characteristics are ascribed herein to pairs of engageable articles. The characteristics of a single surface can be described in terms of its movements when in engagement with an identical surface.

The basic characteristics of the functional surfaces are as follows:

(I) *Direction of engagement.*—This relates to the number of directions substantially normal to the functional surface from which it can engage another functional surface and will be either (A) From one side only, or (B) From two sides.

It is noted that an article according to the invention, having the overall shape of a sheet and carrying separate and unrelated arrays of cam or contour elements on both sides thereof would have two separate surface configurations of class A rather than one configuration of class B. The reason for this is that there is no operational relation between the two functional surfaces of such a sheet. Thus, so far as operation is concerned, they could as well be carried on opposite faces of a cube or other solid figure. A double sided functional surface, on the other hand, engages the cam elements of the complementary surface regardless of whether the complementary surface approaches the double sided surface from the head side (the side facing the heads of the cam elements of the surface) or the base side (the side nearest the base of the surface).

(II) *Depth of engagement.*—Once a functional surface has been engaged from a given direction, its operation is further classified by whether it is capable of (C) Single depth of engagement only, or (D) Multiple depth of engagement.

(III) *Relative motion of engaged article.*—When engaged from a given direction and to a given depth, a functional surface according to the invention is further classified by its ability to move relative to the article with which it is engaged in directions substantially parallel to the planes of the engaged surfaces, i.e. whether the engaged surfaces (E) Can move relative to one another (1) In one direction only (ratchet), (2) In more than one direction, or (F) Cannot move relative to one another.

An additional important feature of the surfaces is the relation between forces required to engage and disengage them.

These functions will also be illustrated hereinafter.

The character of the operation of an engaged pair of articles of the invention depends both upon the configuration of the functional surfaces thereof and upon the manner in which they are engaged. In the simpler articles of the invention which are capable of engagement only in one direction and at a single depth, only a single class of relative motion is possible. In the more complex articles of the invention, the possible depths of engagement will often depend upon the sides of the pair of articles which are engaged and the possible relative motion will depend upon the sides which are engaged and the depth of engagement. This will also be illustrated hereinafter.

Figure 1A:
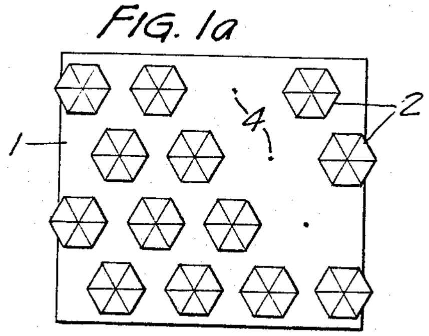
Figure 1C:
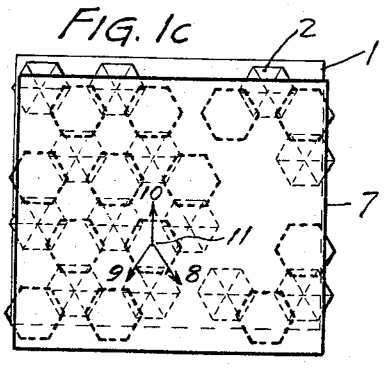
Figure 1B:
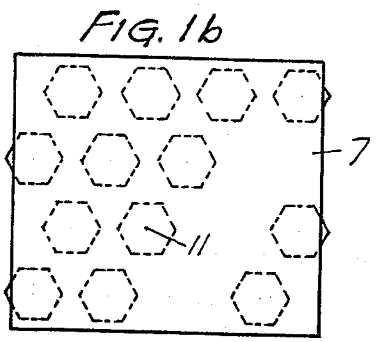
Figure 1D:
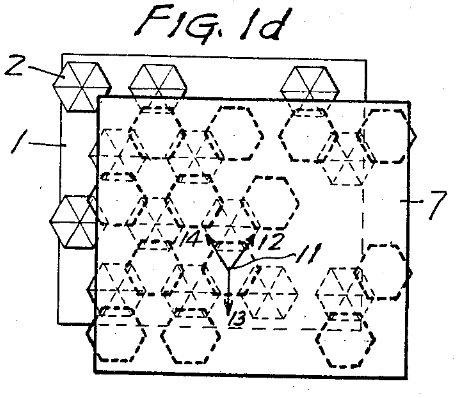

Various embodiments of the invention are illustrated by the accompanying drawings wherein:

FIGS. 1–1*d* are various views of a simple article of the invention (shown both singly and as an engaged pair of identical articles) of class A–C–E2.

Figure 2A:
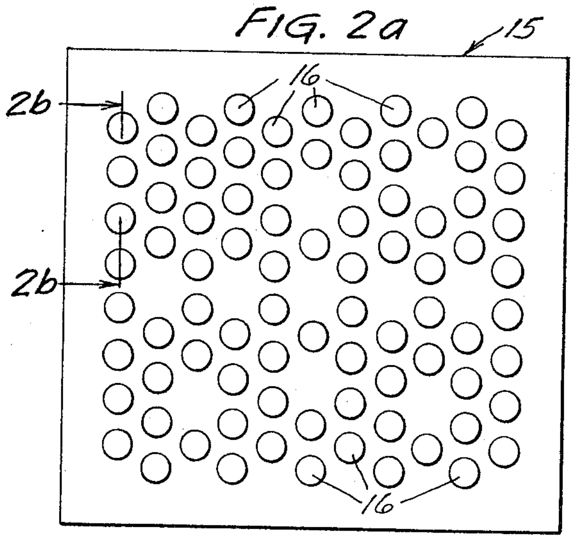
Figure 2B:
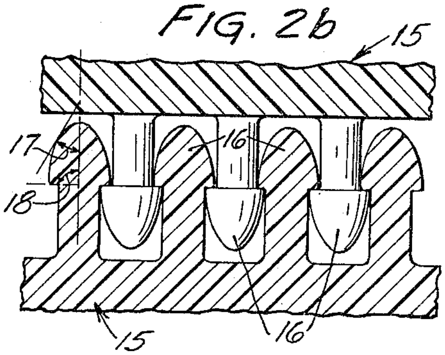

FIGS. 2*a* and 2*b* are views of an article of the invention of class A–C–F.

Figure 3A:
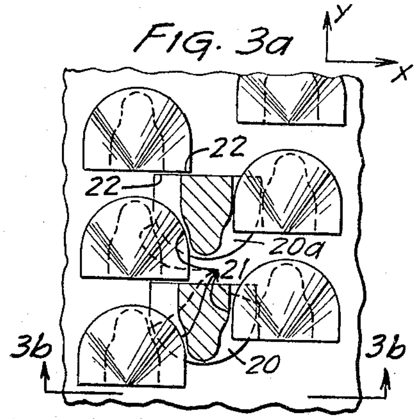
Figure 3:
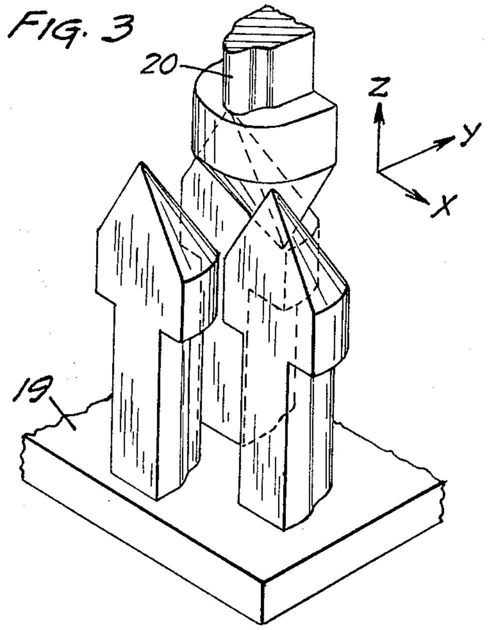
Figure 3B:
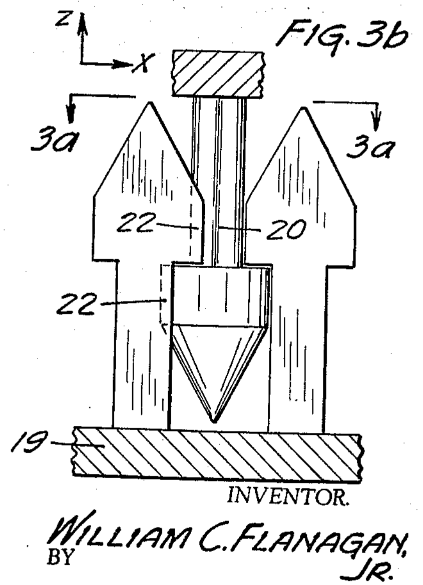

FIGS. 3, 3*a* and 3*b* are perspective, top and side views of a small portion of engaged articles of class A–C–E1.

Figures 4, 4A, 4B, 5, 5A, 5B:
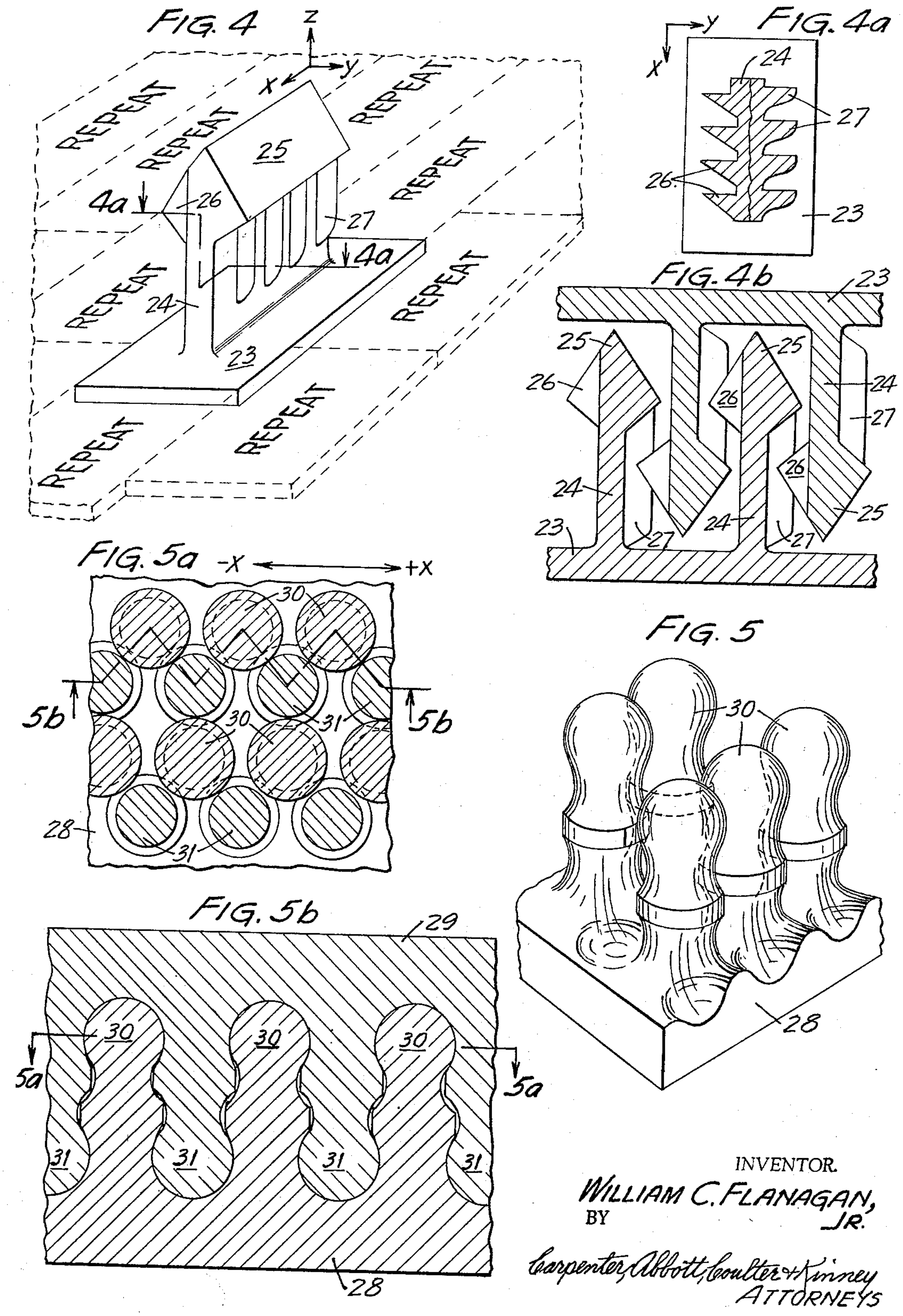

FIGS. 4, 4*a* and 4*b* show another article of class A–C–E1 which differs in design from that of FIGS. 3 and 3*a*.

Figure 5C:
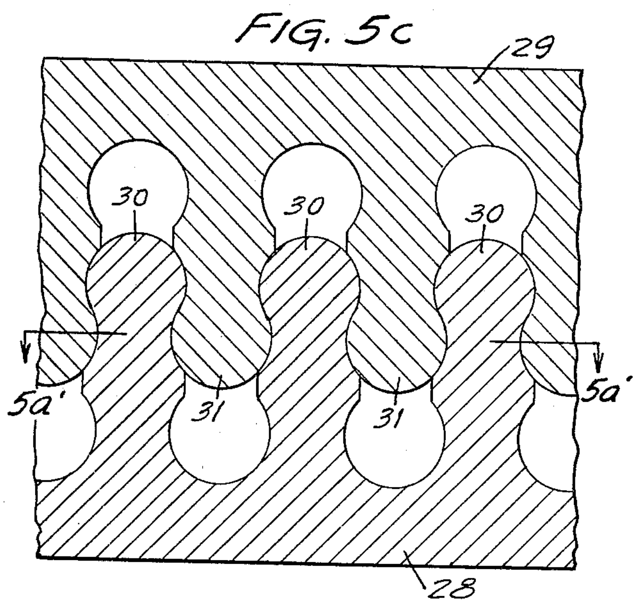

FIGS. 5–5*c* show an article of the invention of classes A–D–E2 and A–D–F, i.e. capable of relative motion parallel to the plane of the functional surface with the article with which it is in first level (shallow) engagement but is not capable of any such motion with the article with which it is in second level (deep) engagement.

Figure 6:
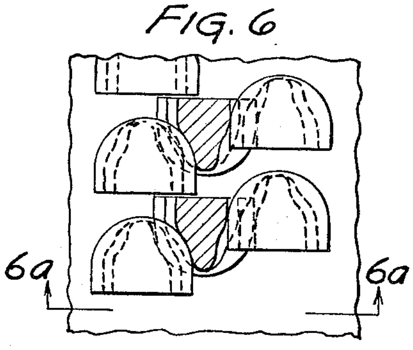
Figure 6A:
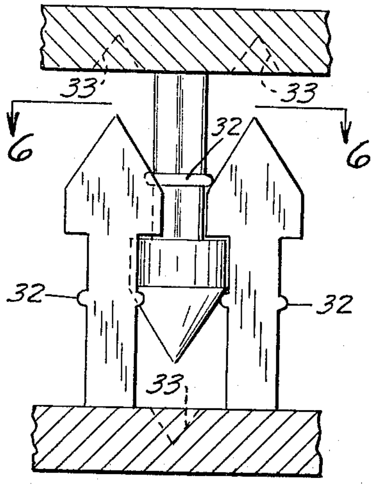
Figure 6B:
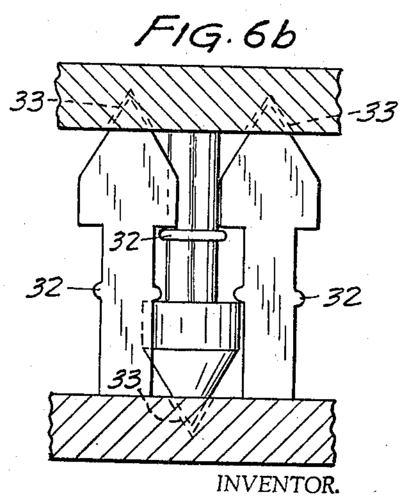

FIGS. 6, 6*a* and 6*b* show an article of classes A–D–E1 and A–D–F which, however, is similar in appearance to the article of FIGS. 3–3*b*.

Figure 7:
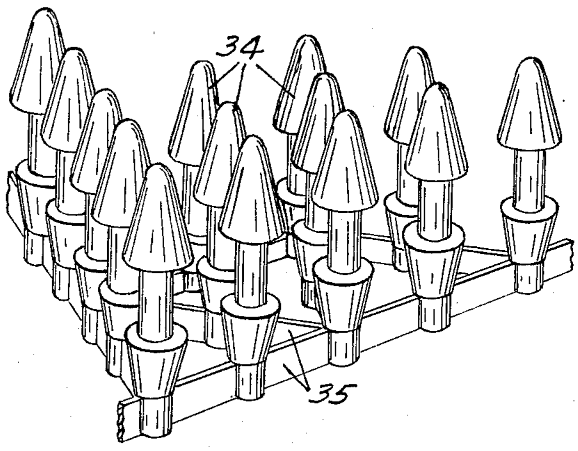
Figure 7A:
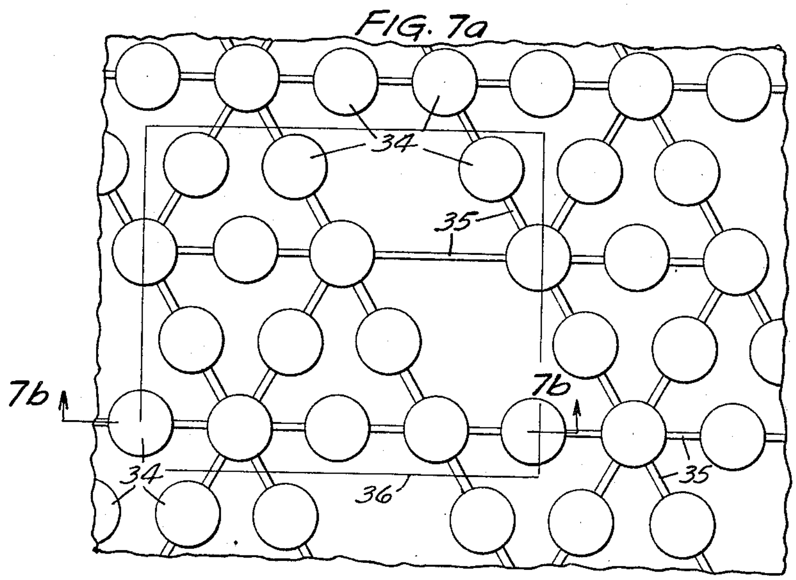
Figure 7B:
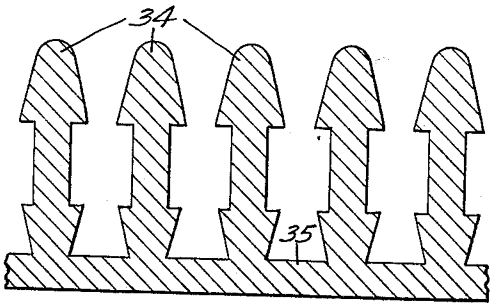
Figure 7C:
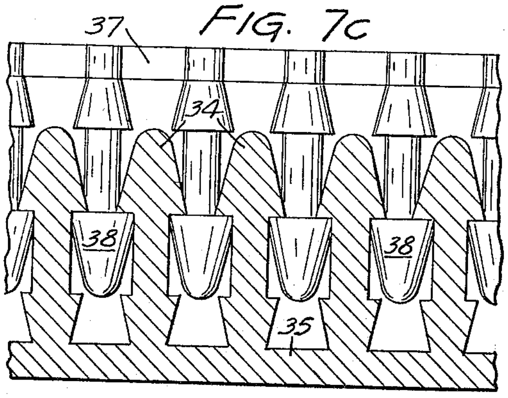
Figure 7D:
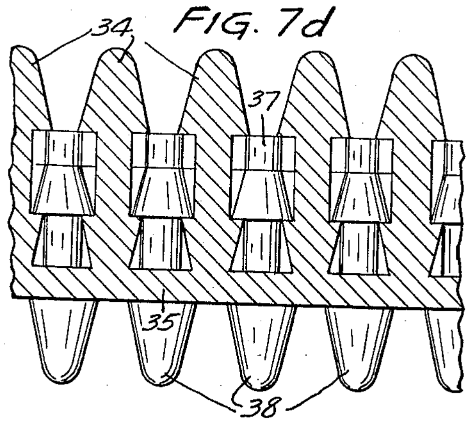
Figure 7E:
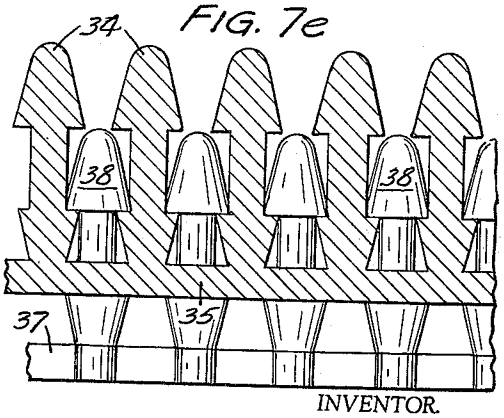

FIGS. 7–7*e* show a relatively complex article of the invention which is capable of engagement in various manners to make possible relative motions while engaged which vary with the manner of engagement, e.g. including B–D–E2, B–D–F and B–C–F.

Figure 8:
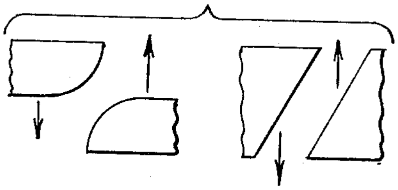
Figure 8A:
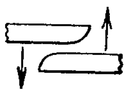
Figure 8B:
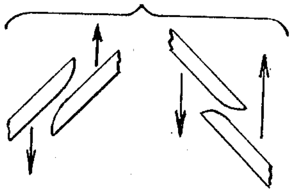
Figure 8C:
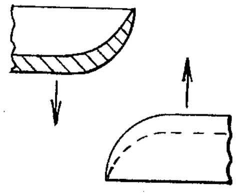
Figure 8D:
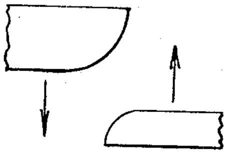
Figure 8E:
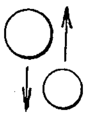

FIGS. 8–8*e* show some of the many possible variations in the contacting portions of the contour elements of articles of the invention.

FIGS. 9–11*a* relate to the locations and orientation of the contour elements on the functional surfaces, i.e. to their arrays.

Figure 12:
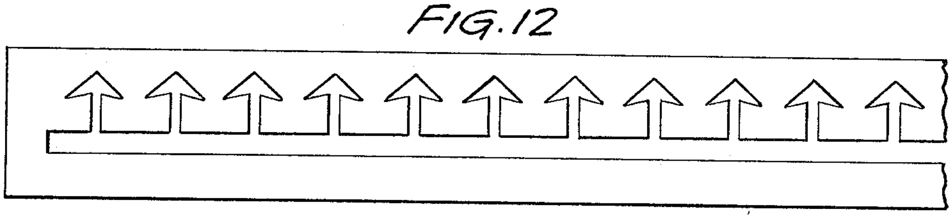
Figure 12A:
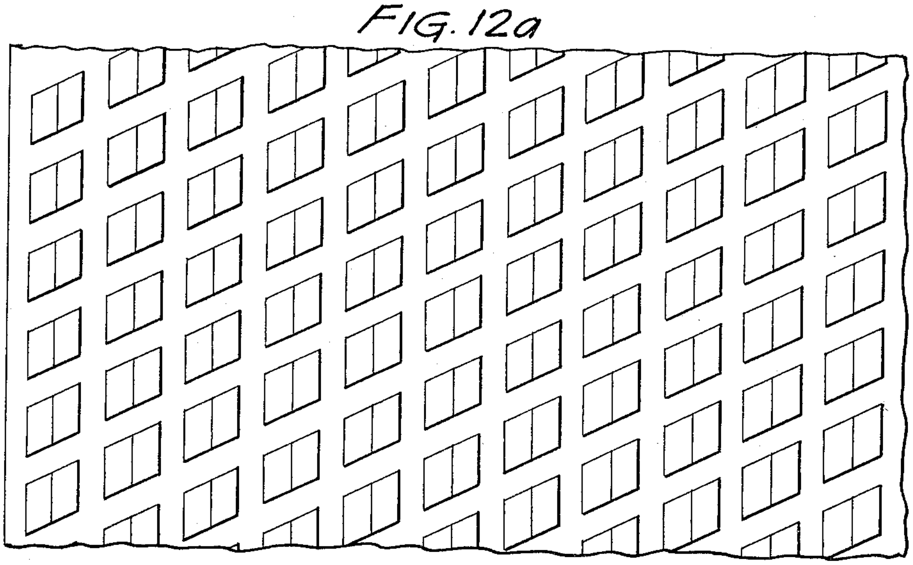
Figure 12B:
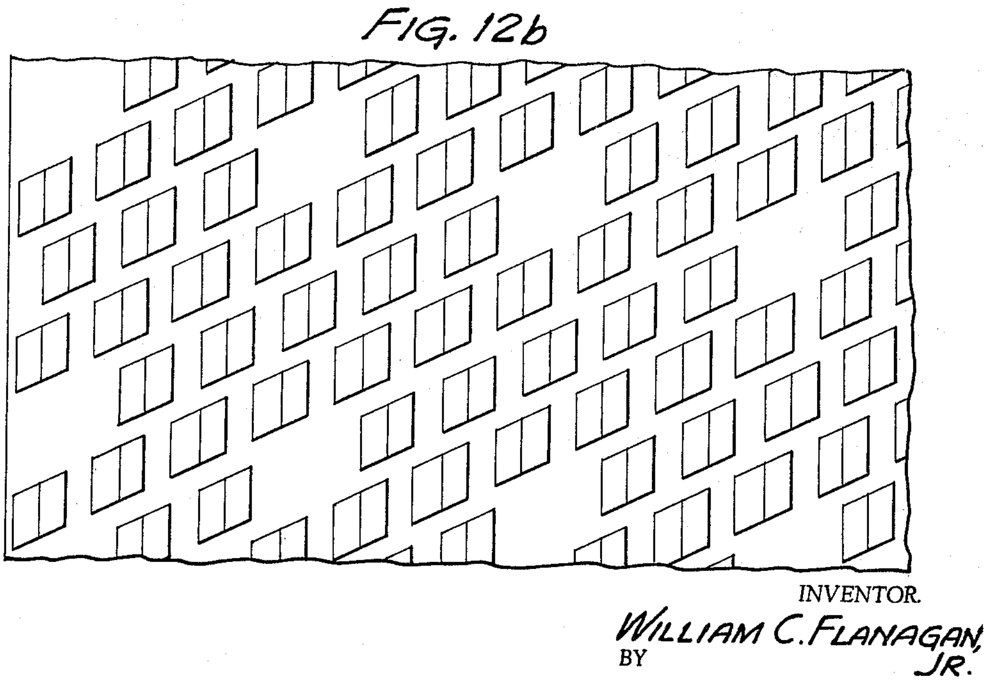

FIGS. 12–12*b* relate to a method for the fabrication of articles of the invention.

FIGS. 13*a*–13*d* relate to a fastener of the invention in which the complementary articles are dissimilar.

Figure 14:
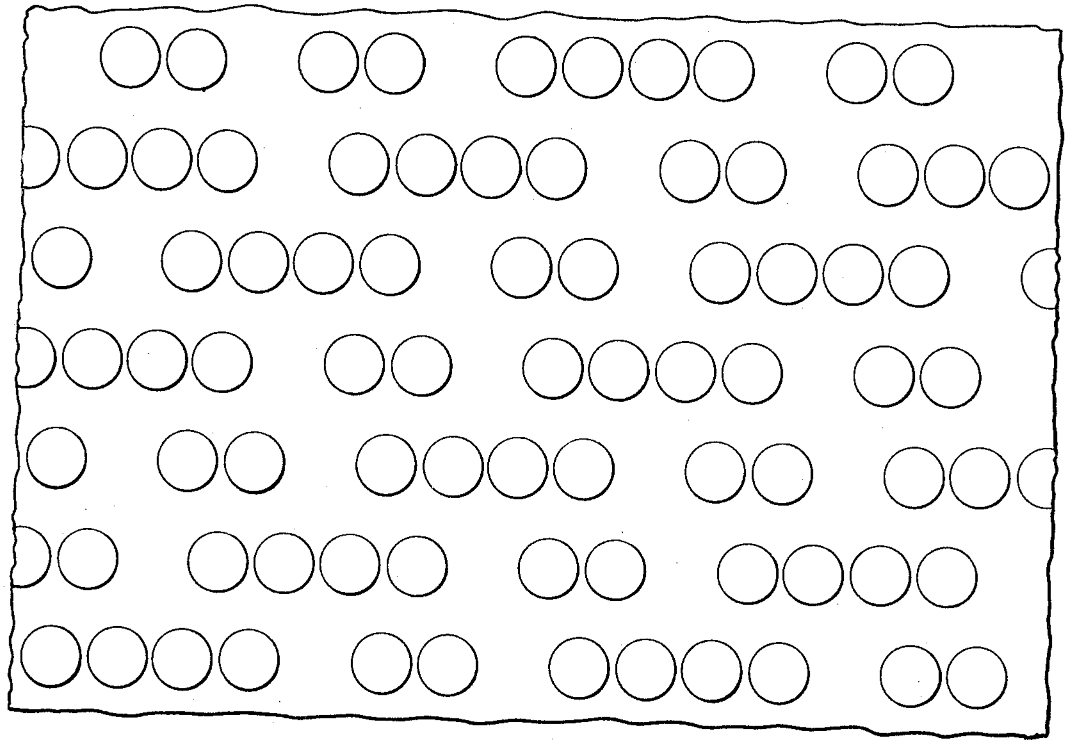

FIG. 14 relates to an article of the invention capable of a number angles of interengagement with a similar article.

FIG. 1 is a perspective view of a single unit pattern 1 of contour elements 2 on an integral base 3. In FIG. 1 the unit pattern contains a number of skipped positions 4 (elements missing from regular element loci). The reasons for this will be explained later. The dotted lines and the words REPEAT indicate that the article is made up of a multiplicity of these unit patterns. The individual contour elements have enlarged head portions 5 and spine-like stems or shanks 6 connecting the heads and the base.

The entire article is unitary and is ordinarily manufactured as a unit.

FIG. 1*a* is a top view of the unit pattern 1 of FIG. 1 showing the contour elements 2 and the locations of the skips 4. FIG. 1*b* is a top view of another unit pattern of the same type 7 viewed from the base side. The outline of the base 7 is shown as a heavy line to differentiate it from the base of 1.

FIG. 1*c* is a diagrammatic view of unit patterns 1 and 7 in operational engagement with one another, the base of 7 being uppermost. The three small arrows 8, 9 and 10 show the three adjacent positions to which the center of reference element 11 can move when unit 7 is moved with respect to unit 1 while remaining in operational engagement with it.

FIG. 1*d* is a diagrammatic view which is similar to FIG. 1*c* but shows the relative positions of 1 and 7 after 7 has moved to the position indicated by arrow 8. Arrows 12, 13 and 14 in FIG. 1*d* show the three adjacent positions to which 11 can move from its position in that figure. Combinations of individual moves in the directions of arrows 8, 9, 10, 12, 13 and 14 can accomplish relative gross movements of units 1 and 7 in essentially any desired direction in the planes of the units while they are in operational engagement.

FIG. 2*a* is a top view of another article of the invention and FIG. 2*b* is a sectional side view of an interlocking pair of such articles viewed from the direction of line **2*b*** of FIG. 2*a*. These articles, like those of FIGS. 1–1*d* require a substantially greater force to disengage than to engage them, but, unlike the articles of FIGS. 1–1*d*, cannot move in any direction parallel to the functional surfaces relative to one another while in engagement. The articles of FIGS. 2*a* and 2*b* also have patterns of skipped element loci. Shown are the bases 15 and the elements 16 which have heads with essentially bullet-shaped entry or engagement surfaces (tops) and flat bottoms or disengagement surfaces. The number 17 denotes the maximum angle between the element axis and the bearing surface of the element up to maximum element displacement during engagement and 18 the maximum angle between the axis and the bearing surface of each element up to maximum element displacement during disengagement, the angles being measured within the element heads.

The articles of the invention in which the force required to disengage is substantially greater than the force required to engage are an important and highly novel subclass. In these articles interengagement is facilitated by contacting head surfaces at relatively acute angles to the direction of movement thus allowing the elements to move one another aside and slide past. On the other hand, disengagement is hindered by contact surfaces at considerably greater angles to the direction of disengagement (often perpendicular or at an even greater angle thereto). Thus, the maximum angle between the axis and the bearing surface of each element up to maximum element displacement during engagement is substantially less than the maximum angle between its axis and bearing surface up to maximum element displacement during disengagement, the angles being measured within the element heads. It is noted that the bearing surfaces during engagement do not extend to the tips of the elements.

FIG. 3 is a perspective view of a small portion of a simple article 19 of the invention with a part of a contour element 20 of a second identical article shown in position to engage it. FIGS. 3*a* and 3*b* are respectively a top view at section **3*a*** of FIG. 3*b* and a side view at section **3*b*** of FIG. 3*a* of a small portion of the same article in engagement with the second article. The mutually perpendicular directions X, Y and Z are shown in the figures. Elements 20 and **20*a*** of a second article are shown in operational engagement with the first article to illustrate the operation thereof. In FIG. 3*a*, the engaged articles are seen to be restrained from relative motion in directions +X and −Y by contact of the elements at the locations 21. Element 20 is restrained from motion in direction +Y with respect to article 19 by contact of the flat surfaces at locations 22 but is able to move in direction −Y by sliding contact at positions 21 accompanied by slight elastic deformation of the elements. The skip pattern of the elements in the array is not shown but is determined by the degree of force required to move the second article in direction −Y with respect to article 19, the larger the percentage of elements omitted, the smaller the force required.

The articles of the invention which are disposed to engagement in which they can move in only one direction relative to one another and parallel to the functional surfaces or which at least move much more easily in one such direction can be designated ratcheting articles and such engagement can be designated ratcheting engagement. They are generally prevented from movement to other engagement in all but two directions parallel to the surfaces by the shape and location of the elements. The two remaining directions are substantially opposite to each other. In one of these directions they can move to the next position of engagement relatively easily since the contacting surfaces on the elements which must pass are at relatively acute angles to the direction of movement thus allowing the elements to move to the side and slide past. On the other hand, movement in the reverse direction is blocked by contacting surfaces which are at substantially greater angles to that direction (often at right angles or even more). When the contacting surfaces are at right angles to the reverse direction, there is no tendency for the elements to slide past one another unless the elements are distorted (e.g. by pressure) so that the angle is made less than a right angle. When the contacting surfaces are at more than right angles to the reverse direction, the elements are actually deformed into positions of greater interference by forces in that direction. Thus, the contacting surfaces of the elements in the ratcheting direction are at relatively acute angles to the ratcheting direction while the contacting surfaces in the reverse direction are at substantially larger angles to the reverse direction, the angles being measured within the contacting portions of the elements.

FIG. 4 is a perspective view of a contour element of an article which is capable of ratchet action when properly engaged with an identical article. FIGS. *4a* and *4b* are respectively a top view along section 4a of FIG. 4 and a side cross sectional view of two articles of the same type in proper operational engagement to ratchet.

Shown in FIG. 4 are the base 23, the stem 24 and the head 25 of the element. The words REPEAT and the dotted lines surrounding the base 23 indicate that the article is made up of a multiplicity of these elements. The directions X, Y and Z are mutually perpendicular. As in all of the other articles of the invention, a skip pattern can be utilized if desired. In this embodiment, however, skips are often unnecessary, particularly if the articles are engaged by sliding them together in the direction X rather than pushing them together in the direction −Z. Also shown in FIG. 4 are the head teeth 26 and the stem teeth 27 which are more clearly illustrated in FIG. *4a*, a top sectional view taken at section 4a of FIG. 4. The interaction between the head teeth of one article and the stem teeth of the other is clearly shown in FIG. *4b*. It is noted that if two articles of the type shown in FIGS. 4–*4b* are engaged in such a way that the head teeth of one do not mesh with the stem teeth of the other, no ratching action will occur. This would result from rotating one article from its proper position 180 degrees about an axis perpendicular to the plane of the functional surface before engaging the articles.

FIG. 5 is a perspective view of an article of the invention 28 having a surface which is capable of multiple depth engagement with another identical surface and FIGS. *5a–5c* are views of engaged articles of the same type. FIGS. *5a, 5b* and *5c* are various sectional views of article 28 in operational engagement with another article 29 which has a functional surface of identical configuration with that of 28. FIG. *5a* is a top view taken at section *5a* of FIG. *5b* and at section *5a* of FIG. *5c*. FIG. *5b* is a side view at section *5b* of FIG. *5a* showing 28 and 29 in lower level engagement. FIG. *5c* is a side view taken at section 5b of FIG. *5a* showing 28 and 29 in upper level engagement. When the articles are in lower level engagement they can undergo no translational motion with respect to one another. When in upper level engagement, they can move relative to one another in the gross directions +X and −X as shown in FIG. *5a*.

The articles of the invention having multiple depth functional surfaces are characterized by enlarged portions on the element stems which are positioned so that the element heads of a complementary article in engagement therewith can remain adjacent to and on either side thereof (i.e. above or below the enlarged portion) and which can be passed by the element heads of the complementary article only by elastic movement of the engaged elements away from their normal positions.

FIGS. 6, *6a* and *6b* are a top view taken at section 6 of FIG. *6a*, a side view in upper level engagement and a side view in lower level engagement (both taken at section 6a of FIG. 6) of a complementary pair of articles which are similar in design to those of FIGS. 3–*3b* but which are capable of two levels of engagement (ratchet action in shallow level engagement and locking in deep level engagement). The action of these articles in shallow level engagement is much the same as those of FIGS. 3–*3b*. The heads of the elements in shallow engagement are retained between the heads of the elements of the other article and the ridges 32 of the stems thereof. In deep engagement the heads are retained between the ridges 32 and the sockets 33 provided in the base of the other article. As shown, this article can be moved with relative ease from shallow to deep engagement and back again, but can be disengaged completely only with considerably greater difficulty. The relative difficulty of changing levels of engagement and of disengagement can be altered in this and the other articles of the invention by changes in design, as shown elsewhere herein.

FIGS. 7–*7e* illustrate an article which is capable of engagement from both sides, i.e. class B. FIG. 7 is a perspective view of a section of this article showing the contour elements 34 carried by a network of relatively narrow but deep beams 35 which make up the base. FIG. *7a* is the top view of the article in which the unit pattern is indicated by the rectangle 36. It is noted that there are skipped positions of the contour elements and of the beams in the unit pattern. The pattern of skips of the contour elements which is used is the same as in FIG. 1. FIG. *7b* is a side view of the article taken at section 7b of FIG. *7a* showing the contour elements 34 and the backing beams 35.

FIG. *7c* is the same side view as FIG. *7a* but also shows a second identical article in face-to-face shallow (first depth) engagement with the first article, the contour elements 38 of the second article being behind the section. In this engagement the articles are capable of relative motion parallel to the planes of the functional surfaces of type E2 (i.e. can move in more than one direction relative to one another while engaged).

FIG. *7d* shows the same articles in deep (second depth) face-to-face engagement with one another. In this engagement the relative motions of the articles parallel to the planes of the functional surfaces is of type F, that is, they cannot move relative to one another. FIG. *7e* shows the same two articles in back-to-face engagement. In this engagement the relative parallel motion of the surfaces is again of type F.

In many of the articles of the invention engagement from a given side and to a given depth can take place from more than one angle. Thus the articles of FIGS. 1–1*d* can be engaged from six different relative positions (achieved by rotating one article about an axis which is perpendicular to the plane of the functional surface in sixty degree increments while holding the other stationary). The relative motions of which these surfaces are capable when engaged in any of the six positions are the same and the surfaces can therefore be termed isotropic. Other articles of the invention have different numbers of possible angles of engagement and may be either isotropic or anisotropic (having different characteristics of relative motion depending upon the angle or position of engagement). The articles of FIGS. 3–3*b* have two possible angles of engagement but are anisotropic (ratchet as shown but if one article is rotated 180° and engaged with the other, then they can move in two directions relative to one another). Comparable functioning of other articles of the invention can be determined by inspection thereof.

Pairs of articles having three or more depths of engagement with differing characteristics of relative motion on each level are also included in the invention, e.g. a pair of articles having three depths of engagement which move in more than one direction in first level (shallow) engagement, which move in one direction only (ratchet) in second level engagement and which lock in third level (deep) engagement.

The control of the tendency of the elements to slide past or to be restrained from sliding past elements on other functional surfaces is of great importance in the articles of the invention. This is true in their engagement and disengagement and also in their functioning when engaged. The sliding past involves elastic deformation of portions of the elements. Thus the elements or portions thereof are pushed aside, twisted, etc. but their volume is not substantially changed. A wide variety of materials and a wide range of configurations (e.g. of the deforming and/or contacting portions of the articles) can be used. Some of the possible variations in the design of contacting portions of the contour elements are shown in FIGS. 8–8*e*. In each case the arrows indicate the direction of engagement, the direction of disengagement being considered to be 180° from the direction of engagement (although in the actual articles of the invention the directions of engagement and disengagement are not always exactly 180 degrees apart). FIG. 8 shows relatively heavy contacting portions with a slight overlap; FIG. 8*a* shows relatively light contacting portions with greater overlap; FIG. 8*b* shows angled contacting portions to decrease or increase the ease of engagement or disengagement; FIG. 8*c* shows contacting portions reinforced by relatively light, flexible webs to increase the disengaging force while not greatly affecting the engaging force (the contacting portion of the upper element being shown in section with the web behind the section and the contacting portion of the lower element being obscured by the web and indicated by a broken line); FIG. 8*d* shows one heavy and one light contacting element and FIG. 8*e* shows contacting portions of circular cross section (spheres, cylinders, cones, etc.) which equalize engaging and disengaging forces. Irregularly shaped contacting portions of the functional surfaces are also commonly used, but the design principles used in connection with them to obtain the desired relative engaging and disengaging forces are the same as with the simpler shapes shown. Depending upon the overall geometry of the contour element, the elastic deformation may take place in the contacting portion of the element or in some other portion thereof.

FIGS. 9–11*a* relate to the arrays of elements on the functional surfaces. The arrays are determined by the overall pattern of the locations of elements (e.g. the grid as previously noted), the relative distance between these locations (both in different directions on the functional surface and in the same direction in different locations on the surface), the orientation of the elements and the skipped positions.

Figure 9:
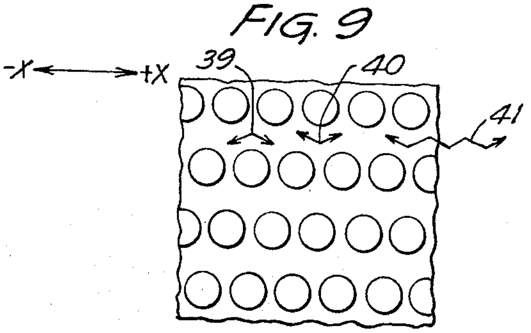
Figure 9A:
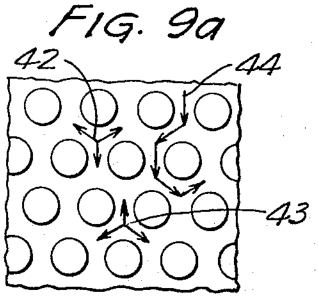

FIGURES 9 and 9*a* illustrate articles in which the relative distance between the elements vary in different directions. The elements in the article of FIG. 9 are spaced so that it can undergo gross relative motion with respect to a second similar article with which it is operationally engaged only in the direction +X and −X. Thus, assuming no other particular features which would further restrict the motion of the engaged articles, an individual element of the second article at point 39 could move only in the two directions indicated by the small arrows at that point to a point comparable to point 40. From point 40 an element of the second article could move only in the two directions indicated by the small arrows to a point comparable to 39. The overall possible relative motion of the articles is represented by the line 41. The elements of the article of FIG. 9*a* are spaced so that it can undergo overall gross relative motion with respect to a second similar article with which it is operationally engaged in essentially any direction parallel to the planes of the functional surfaces. Thus an individual element of the second article at point 42 could move in any of the three directions indicated by the small arrows at that point to a point comparable to 43. From point 43 an element of the second article could move in any of the three directions indicated by the arrows at that point to a point comparable to 42. The line 44 indicated one of an essentially infinite number of relative movements of engaged articles of this type which are possible.

Figure 10:
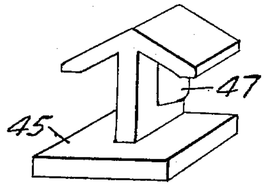
Figure 10A:
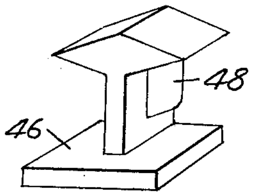
Figure 10B:
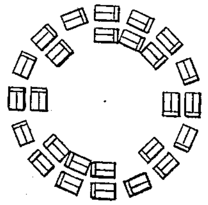

The orientation of the individual elements relative to the base is also of great importance in the articles of the invention. Ordinarily but not necessarily the axes of the elements are perpendicular to the base plane of the functional surface. Thus, for example, the axis of rotation of an element having a circular cross section is ordinarily perpendicular to the base plane. More often the orientation of elements not having circular cross sections about their axes is a consideration. FIGURES 10–10*b* illustrate this. FIGURE 10 and 10*a* are details of simple elements of this type and FIG. 10*b* is a circular array of these elements in which orientation is important with respect to their ability to interact with complementary articles. For simplicity of illustration only two rows of elements are shown in FIG. 10*b* although as previously noted, in an actual article of the invention there would be a larger number of rows. Element 45 of FIG. 10 is designed to resist strongly disengagement normal to the functional surface with a similar article on a complementary surface. Element 46 of FIG. 10*a* is designed to resist such disengagement less strongly. Element 45 includes the contacting element 47 which is deformed when the functional surface moves to the next operational engagement position with respect to a complementary surface with which it is engaged. Element 46 includes a similar contacting element 48. The rectangles in FIG. 10*b* which are arranged in a circular pattern are top views of elements of types 45 and 46. Elements of the types of 45 and 46 can be used together in the same articles in such a way that operationally engaged articles can be easily disengaged in some positions but not in others.

Figure 11:
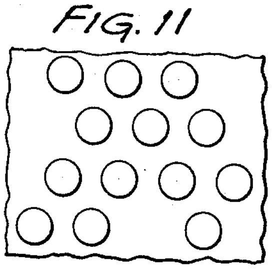
Figure 11A:
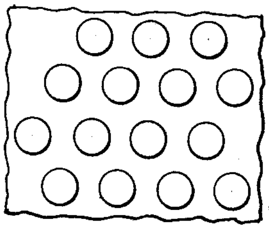

The simultaneous interpenetration of large surfaces of elements ordinarily requires a percentage of skips (i.e. elements missing from element loci). Such skips are shown in a number of the drawings (e.g. see FIGS. 1, 2*a*, 7*a*, 13*a* and 13*b*). The reasons for this is that the heads of the elements would otherwise interfere with one another to the extent that operational engagement occurrences would be difficult or impossible. Thus, skipped positions are commonly introduced, often (although not necessarily) in a repeating pattern. FIG. 11, for example, shows a unit pattern of 13 elements and 3 skip positions (i.e. 81% of the positions filled) and FIG. 11*a* shows a unit pattern of 15 elements and 1 skip position (94% of the positions filled). Skip patterns are sometimes not necessary, e.g. where there are relatively few rows or ranks of elements on a functional surface or where there is a relatively flexible portion of each element head which allows entry without great lateral pressure. It is noted that, in view of the skipped positions, certain individual elements in engaged surfaces will not be in contact with a normal number of elements from the complementary surface. This does not alter the general operation of the surfaces, however, which depend upon this contact in the case of a large number of the elements on the surface.

The unitary articles of the invention lend themselves to fabrication by known techniques including injection molding, compression molding, extrusion, progressive stamping and die forming, casting using collapsible element molds and investment molds, embossing, vacuum forming, etc. Additional details in two such methods of preparing the articles are as follows:

The stock from which the article is to be made is extruded in molten form from a die of which the opening is in the shape of the cross section of the article (FIG. 12). The extruded web is partially solidified and the continuous shaped extruded members are separated into individual contour elements (FIG. 12*a*) by means of a heated cutting chain running across the moving web (a certain percentage of the chain links being cutting elements). The web is next subjected to a hot jogging operation to offset the axes of the contour elements into a herringbone pattern (i.e. the stems are bent to either side so that they are no longer perpendicular to the base) and skips are introduced if desired by removal of some of the elements (FIG. 12*b*).

In another method, a plain web of stock is hot pressed between two rolls, one of which carries dies for the formation of contour element stems and an additional blank of material (ordinarily in the form of an extension of the stem) from which the head is later formed. Next the web is run around a larger roll which carries on its surface swaging dies for forming heads on the contour element stems. The swaging roll is hot where it first contacts the stock web carrying these spines but is rapidly cooled while still in contact therewith. The web carrying the contour elements is then treated in a manner which depends upon the nature of the stock used, e.g. if ceramic it is fired, if plastic it is annealed, etc.

Figure 13A:
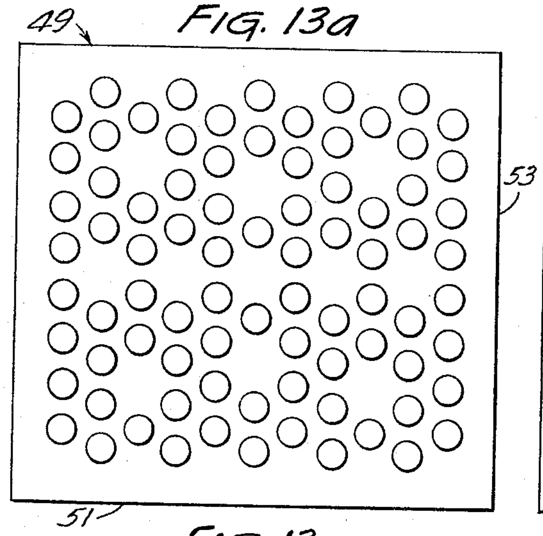
Figure 13B:
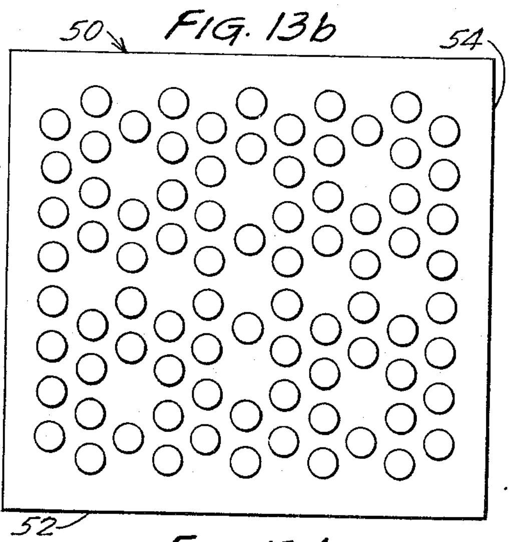

Certain articles of the invention are disposed to engagement in which some elements are substantially out of their normal positions. This is illustrated in FIGS. 13*a*–13*d*. FIGURES 13*a* and 13*b* are top views respectively of a simple article 49 of the invention having relatively short-stemmed elements and of a second article 50 which is similar to 49 except that it has relatively long-stemmed elements.

Figure 13C:
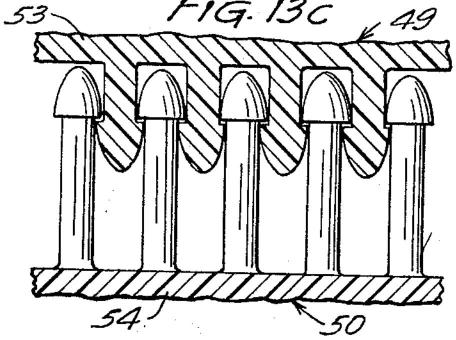
Figure 13D:
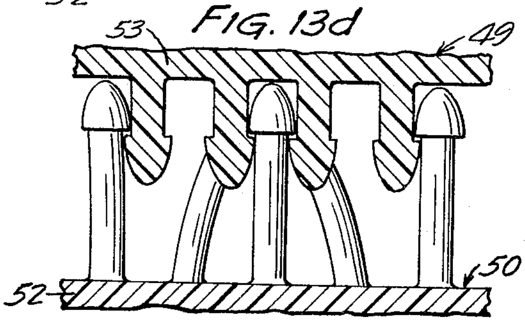

FIGURE 13*c* is a side view partially in section of fragments of articles 49 and 50 in engagement with their respective side edges 53 and 54 parallel. This is the position of normal engagement for the two complementary (but dissimilar) surfaces and all of the elements are in their normal (unstrained) relative positions. FIG. 13*d* is a similar view of fragments of articles 49 and 50 engaged with the side edge 53 of article 49 and the front edge 52 of article 50 parallel. In this position the longer and hence more flexible elements of 50 are able to deform sufficiently to accommodate the differences of spacing and interengage. If the stems of the elements of both articles were short (as those of article 49), engagement of the type of FIG. 13*d* would not be possible. If, on the other hand, the stems of the elements of both articles were long (as those of article 50), considerable relative motion of the engaged articles would be possible (from the position in which the tops of the heads of each article touch the base of the other to the position in which the undersides of the heads of the articles touch). Thus, to obtain the ability to accommodate to different element spacings together with snug engagement in which there is little or no relative motion between the articles, it is necessary in this case to use dissimilar functional surfaces.

In many applications this ability to accommodate to different element spacings would be of little importance. However, in applications in which the relative orientations of the two articles are difficult to determine or where they might be wrongly oriented because of carelessness or lack of understanding of the fastener, such accommodation is very important.

The ability to accommodate to positions out of the normal unstrained position can be combined with a degree of lack of symmetry in the spacings between the loci of the elements to introduce further versatility into articles of the invention. FIG. 14 illustrates this. It is the top view of an article of the invention in which the loci of the elements are defined by a grid of isosceles triangles (the corners of the triangles being the centers of the loci). In this article the shorter leg of each triangle is about 60–65 percent as long as the two longer legs and 25% of the element loci are skipped. The side views of the elements are similar to those of article 50 of FIG. 13*c*. Between this article and a similar complementary article 36 different angular positions of interlock are possible. In many of these positions, the elements and the spaces into which they fit do not exactly correspond and distortion of some of the elements is necessary to achieve interlocking. Further versatility in angles of interlock can be introduced by further lack of symmetry (additional randomness) in element loci. On the other hand, the more symmetrical articles of the invention (e.g. those of FIGS. 1–1*d*, 2*a* and 2*b*) have fewer angular positions of entry.

The articles of the invention can consist of many types of materials, e.g.:

Thermoplastic and thermosetting polymers such as polyethylene, polypropylene, nylons, melamine, polystyrene, polycarbonates, various fluorinated polymers, epoxy resins, cellulose acetate, vinyl chloride polymers, copolymers of the above and other materials, modified polymers including filled and plasticized polymers, etc.;

Metals and metal alloys such as copper, carbon-steels, aluminum and its alloys, stainless steel, nickel and its alloys, tin and aluminum brasses, Phosphor bronzes, molybdenum and its alloys, Monel, etc.;

Ceramics, glasses, cermets such as molybdenum-aluminum oxide and tungsten-titanium carbide;

Fibrous products such as papers, resin bonded fibrous sheeting, laminated sheets, glass filament reinforced webs, etc. The actual material which is chosen for a particular application depends upon such factors as suitability to fabrication in the desired configuration, projected ambient conditions of use (heat, moisture, acidic or basic conditions, etc.), mechanical conditions of use (tensile, modulus of elasticity, ability to withstand repeated flexing), etc.

The contour elements of the invention vary greatly in size and proportions the actual limits depending largely upon the ease and efficiency of production and the needs of particular use applications.

The versatility of the articles of the invention with respect to function as well as materials of construction render them widely useful. Panels or hangings can be attached to walls with great ease, invisibly and, if desired with great tenacity. A multiple function surface of the invention can be used to hold a heavy object being mounted on a fixed surface in approximately the desired position (e.g. by functional surfaces thereon in shallow engagement) while it is rotated, translated, ratcheted or otherwise adjusted before being permanently positioned (pressing the functional surfaces into deep engagement). Permanently positioning the surfaces can, because of the ability to adjust relative positions precisely and the positive contacts obtained, complete a complex series of electrical connections. Various polymeric systems can likewise be used in conjunction with the articles of the invention. Thus, for example, the base surface between the contour elements of the functional surface can be coated to any desired depth with a liquid or partially cured semi-solid polymeric system, the surface engaged with another functional surface and the polymer thereafter activated and/or cured. Some types of systems which can be used in this way are cements (which can be subsequently dried), sealants (which can be subsequently set), foaming system (which can be subsequently foamed) and cross linking polymers (which can be subsequently cross linked).

An article of the invention in the form of a ribbon or strip having one double sided functional surface (class B) can be wrapped around one or more objects and the functional surface near the ends of the article then engaged (back to face engagement) without need for another article of the invention and without twisting the surface. Suitably designed strips having ratcheting surfaces can be wrapped around objects, the ends thereof brought together and the tightness of the wrap adjusted by the ratcheting action. Slip clutch or braking action can be instituted between engaged surfaces whose motion with respect to one another is either linear or rotary. Torque can be carried by the functional surfaces. In any of the foregoing, the fact that an area is involved reduces the local stresses and wear and allows much greater loads to be held and manipulated safely. Adverse conditions of temperature, humidity, chemical corrosion, dirt, grease, etc. are of comparatively little concern. The articles can be designed to disengage or move from one level of engagement to another easily, with difficulty or not at all (i.e. only with failure of the material of which the unitary article is constructed). They can be made to be reusable many times or only once. They can be made to engage in an intermediate stage of the material of construction (for example a green ceramic or partially cured polymer) and then function in the final stage.

What is claimed is:

1. A fastener consisting of a complementary pair of interengaging unitary articles each having a functional surface comprising multiple rows of flexible cam elements emanating from a relatively rigid backing member which remains essentially flat during engagement and disengagement of the articles, in which:

(1) the elements comprise stems terminating in enlarged shaped heads which bear against the element heads of the other article during engagement and disengagement, said heads being substantially non-deformable, (2) the spaces between the heads of the individual elements of one of the pair of articles are smaller than the space occupied by the head of each element of the other article, and (3) the rows of elements have vacant element positions to provide empty spaces at intervals over said functional surfaces so as to allow deflection of the elements during engagement and disengagement.

2. A fastener according to claim 1 having means for permitting simultaneous interlocking over the entire arrays of locking elements.

3. A fastener according to claim 1 wherein the surfaces comprising the arrays of locking elements on the two articles have dissimilar configurations.

4. A fastener according to claim 1 where the articles are disposed to engagement in which substantially all of the elements are in their normal relative positions.

5. A fastener consisting of a complementary pair of interengaging unitary articles each having a functional surface comprising multiple rows of flexible cam elements emanating from a relatively rigid backing member which remains essentially flat during engagement and disengagement of the articles, in which:

(1) the elements comprise stems terminating in enlarged shaped heads which bear against the element heads of the other article during engagement and disengagement, said heads being substantially non-deformable, (2) the spaces between the heads of the individual elements of one of the pair of articles are smaller than the space occupied by the head of each element of the other article, (3) the rows of elements have vacant element positions to provide empty spaces at intervals over said functional surfaces so as to allow deflection of the elements during engagement and disengagement, and (4) the maximum angle between the axis and the bearing surface of each element during engagement is substantially less than the maximum angle between the axis and the bearing surface of each element during disengagement, the angles being measured within the element heads, whereby the force required to disengage the articles is substantially greater than the force required to engage them.

6. A fastener according to claim 5 wherein the axes of the elements are substantially perpendicular to the planes of the articles.

7. A fastener according to claim 5 having means for limiting interengagement to only one side of the arrays of elements.

8. A fastener according to claim 7 wherein the articles have means for limiting interengagement to single depth.

9. A fastener according to claim 8 wherein the engaged articles cannot move relative to one another in any direction substantially parallel to the functional surfaces.

10. A fastener according to claim 8 wherein the engaged articles have means permitting movement relative to one another substantially parallel to the arrays of locking elements.

11. A fastener according to claim 5 wherein the articles are disposed to engagement in which they have means permitting moving relative to one another substantially parallel to the arrays of elements.

12. A fastener according to claim 11 wherein the articles are disposed to engagement in which they are capable of moving relative to one another in more than one direction substantially parallel to the arrays of elements.

13. A fastener according to claim 5 wherein the articles are capable only of single depth interengaging.

14. A fastener according to claim 5 wherein the articles are disposed to engagement in which they cannot move relative to one another in any direction substantially parallel to the arrays of elements.

15. A fastener consisting of a complementary pair of interengaging unitary articles each having a functional surface comprising multiple rows of flexible cam elements emanating from a relatively rigid backing member which remains essentially flat during engagement and disengagement of the articles, at least one of the articles having a double sided functional surface which is capable of interlocking with the complementary article from both sides of its array of elastic elements, in which:

(1) the elements comprise stems terminating in enlarged shaped heads which bear against the element heads of the other article during engagement and disengagement, said heads being substantially non-deformable, (2) the spaces between the heads of the individual elements of one of the pair of articles are smaller than the space occupied by the head of each element of the other article, (3) the rows of elements have vacant element positions to provide empty spaces at intervals over said functional surfaces so as to allow deflection of the elements during engagement and disengagement, and (4) the base of the double sided functional surface contains openings between the elements which enlarge by elastic distortion of the adjacent portions of the base to admit the heads of the elements of the complementary article.

16. A fastener according to claim 15 wherein the unitary articles have means for permitting relative motion in more than one direction substantially parallel to the functional surfaces when in operational engagement from one side of the double sided functional surface and are are incapable of relative motion when in operational engagement from the other side of the double sided functional surface.

17. A fastener according to claim 15 wherein both unitary articles have double sided surfaces.

18. A fastener consisting of a complementary pair of interengaging unitary articles each having a multiple depth functional surface comprising multiple rows of flexible cam elements emanating from a relatively rigid backing member which remains essentially flat during engagement and disengagement of the articles, in which:

(1) the elements comprise stems terminating in enlarged shaped heads which bear against the element heads of the other article during engagement and disengagement, said heads being substantially non-deformable and said stems each having an additional enlarged portion thereon, (2) the spaces between the heads of the individual elements of one of the pair of articles are smaller than the space occupied by the head of each element of the other article, (3) the rows of elements have vacant element positions to provide empty spaces at intervals over said functional surfaces so as to allow deflection of the elements during engagement and disengagement, and (4) the element heads can be seated on either side of the additional enlarged portions on the stems of the complementary article and can pass by the said enlarged portions only by elastic movement of the engaged elements away from their normal positions.

19. A fastener according to claim 18 wherein the articles are disposed to engagement in which they have means for limiting motion thereof to ratcheting in upper level engagement and are incapable of moving relative to one another in lower level engagement.

20. A fastener according to claim 18 wherein the articles are disposed to engagement in which they are capable of moving in more than one direction relative to one another in upper level engagement and are incapable of moving relative to one another in lower level engagement.

21. A fastener consisting of a complementary pair of interengaging unitary articles which are disposed to ratcheting engagement in which they can move in only one direction relative to one another and substantially parallel to the functional surfaces with relative ease, each having a functional surface comprising multiple rows of flexible cam elements emanating from a relatively rigid backing member which remains essentially flat during engagement and disengagement of the articles, in which:

(1) the elements comprise stems terminating in enlarged shaped heads which bear against the element heads of the other article during engagement and disengagement, said heads being substantially non-deformable, (2) the spaces between the heads of the individual elements of one of the pair of articles are smaller than the space occupied by the bead of each element of the other article, (3) the rows of elements have vacant element positions to provide empty spaces at intervals over said functional surfaces so as to allow deflection of the elements during engagement and disengagement, and (4) the contacting surfaces of the elements in the ratcheting direction are at relatively acute angles to the ratcheting direction and the contacting surfaces in the reverse direction are at substantially larger angles to the reverse direction, the angles being measured within the contacting portions of the elements, and relative motion in all other directions parallel to the functional surfaces is blocked by the shape and location of the elements.

22. A fastener consisting of a complementary pair of interengaging unitary articles which are disposed to engagement in which they are capable of rotary motion about a fixed center relative to one another and substantially parallel to the functional surfaces, each having a functional surface comprising multiple rows of flexible cam elements emanating from a relatively rigid backing member which remains essentially flat during engagement and disengagement of the articles, in which:

(1) the elements comprise stems terminating in enlarged shaped heads which bear against the element heads of the other article during engagement and disengagement, said heads being substantially non-deformable, (2) the spaces between the heads of the individual elements of one of the pair of articles are smaller than the space occupied by the head of each element of the other article, (3) the rows of elements have vacant element positions to provide empty spaces at intervals over said functional surfaces so as to allow deflection of the elements during engagement and disengagement, and (4) when the articles are in rotary engagement all relative motion except rotary motion parallel to the surfaces is blocked by the shape and location of the elements.

References Cited by the Examiner

UNITED STATES PATENTS

| | | | |
|---|---|---|---|
| 2,499,898 | 3/1950 | Anderson. | |
| 3,101,517 | 8/1963 | Fox | 24—204 |
| 3,191,255 | 6/1965 | Nealis | 24—204 X |
| 3,192,589 | 7/1965 | Pearson | 24—204 |

BERNARD A. GELAK, *Primary Examiner.*